W. S. SOUTHWICK.
AUTOMATIC FILLING REPLENISHING LOOM.
APPLICATION FILED JULY 10, 1917.

1,422,897.

Patented July 18, 1922.
10 SHEETS—SHEET 3.

UNITED STATES PATENT OFFICE.

WILLIAM S. SOUTHWICK, OF CLINTON, MASSACHUSETTS, ASSIGNOR, BY MESNE ASSIGNMENTS, TO WICKWIRE SPENCER STEEL CORPORATION, A CORPORATION OF MASSACHUSETTS.

AUTOMATIC FILLING-REPLENISHING LOOM.

1,422,897. Specification of Letters Patent. Patented July 18, 1922.

Application filed July 10, 1917. Serial No. 179,677.

*To all whom it may concern:*

Be it known that I, WILLIAM S. SOUTHWICK, a citizen of the United States, residing at Clinton, in the county of Worcester and State of Massachusetts, have invented new and useful Improvements in Automatic Filling-Replenishing Looms, of which the following is a specification.

This invention relates to looms for weaving wire cloth with particular reference to wire cloth having a hard or large wire filling.

In this type of loom, when using a large or hard wire for the filling, a bar or other positive means for operating the shuttle is usually employed as distinguished from a picker-staff to operate a so-called fly shuttle. Further, in this type of loom, when using a large or hard wire for the filling, it is not practical, and further, as a practical matter, in my experience it is impossible, to put such wire upon a bobbin, so-called, and have the said wire filling pulled off from the tip in the weaving operation, as when employing fillers of cotton or other fibre; but such large or hard wire filling is wound upon a spool-shaped holder, that is arranged in the shuttle and the said filling is removed from said spool in the weaving operation by unwinding from the top surface of the spool, as in unwinding thread from any spool from the top. In this general type of loom, that is, a loom for weaving wire fabric but employing a soft, fine wire for the filling, while it is the practice to use a fly shuttle, so-called, and a picker-staff for operating the shuttle, yet it is not practical and is not the practice, so far as I am aware, to wind this soft, fine wire filling upon a bobbin and have the filling pulled off from the tip of the bobbin; but, on the contrary, in such case, such soft, fine wire filling is wound upon an arbor or centre piece to the required size and then removed from the arbor and forced into place and locked in the shuttle, and in the weaving operation such soft wire filling is pulled out from the inside of the tube-shaped ball, instead of being unwound from the spool, and as distinguished from being pulled off from the tip as with a bobbin. In a word, in this type of loom, whether employing soft, fine wire filling or a hard or large filling, the bobbin construction used for handling fibre fillings is, in my experience, impractical and inoperative. So far as I am advised, the fibre fabric looms cannot be used for weaving wire cloth and particularly for weaving wire cloth with a stiff or hard filling, and are not designed or intended for such use.

So far as I am aware it has always been the practice, in the use of looms for weaving wire cloth, not to employ a magazine or replenishing mechanism, so-called, for substituting a loaded filler container for an empty or exhausted filler container in the shuttle, but upon the container in the shuttle becoming empty or becoming empty to a predetermined extent, it has been the practice, prior to my invention to stop the loom and by hand remove the spent filling container from the shuttle and replace it with a loaded filling container.

I believe myself to be the first in looms for weaving wire cloth to provide automatic means for supplying loaded containers to a shuttle.

I believe that I am the first to utilize a waste-end filling remover that acts to give up a substantial part of the end of the filling to be caught by the warp and woven in the fabric and then acts to remove the severed end portion.

I believe I am the first to provide a waste-end filling holder that includes a cushioning element to arrest by cumulative force the drawing-in movement of the filling.

I use the term "spool" in this specification to indicate a container for hard or large wire filling in order to distinguish such container construction not only from a bobbin, but also from the tube-shaped ball or the form in which the wire filling is arranged and put in a shuttle when said filling is composed of soft, fine wire. Each spool is mounted upon a holder, the spool and its holder thus constituting a unit. One such unit is carried by the shuttle, while a plurality of them are held in reserve in the magazine, and whenever filling replenishment is required automatic mechanism is brought into operation to transfer one such unit from the magazine to the shuttle. The ingoing full unit ejects the empty unit from the shuttle. The spools and holders therefor have cooperative elements whereby they are coupled, and the holders and shuttle have cooperative elements whereby the holders are held in the shuttle. When a filling unit is in operative position in the shuttle there is no relative movement as between the spool holder and the shuttle, but the spool is capable of rotating relatively to the holder as the filling is drawn off.

A friction device carried by the filling unit is arranged to arrest unwinding movement of the spool each time the shuttle reaches the end of its traverse, and tension is thus maintained on the filling as the shuttle goes back and forth through the shed.

While in the form shown, the friction device as carried by the holder engages a spool, similar or like results might be obtained by a friction device carried by the shuttle and arranged to engage the spool, although I prefer the friction device arranged and shown as connected and carried by the holder.

The filling container or support is in the form of a spool, having a core on which the filling is wound, and having two flanges at the ends respectively of the core to confine the fillings. The operation of the filling-replenishing mechanism is controlled by a filling feeler, and such feeler is arranged to time the filling-replenishing operation according to the radial distance between the rim of one of the spool flanges and the periphery of filling on the core. This insures accuracy as to timing, because the radial distance between the core and the rim of the flange can be determined closely and does not vary to any appreciable extent. The quantity of filling left on the core of the empty spool may therefore be reduced to a minimum without sacrificing certainty of operation of the filling-replenishing mechanism.

The invention includes a filling cutter that cuts the end of the old filling and that cuts the end of the new filling close to the edge of the fabric, the first cutting operation occurring simultaneously with the last beat in which the old filling is used, and the second cutting operation occurring simultaneously with the first beat in which the new filling is used. It is thus assured that there will be no outlying ends of filling that could be accidentally drawn into the fabric, for what remains of the old filling is removed by the discharged unit, and the outlying end of the new filling is connected to a device that pulls it away from the fabric as soon as it is cut.

The specific cutting mechanism disclosed herein is claimed in my copending application Serial No. 449,836, filed Mar. 5, 1921.

On the drawings:

Figure 23 represents a perspective view, somewhat conventional in character, showing the lay, the shuttle, take-up mechanism, the unwoven warp members, and the woven fabric.

The same reference characters indicate the same parts wherever they occur.

I have not attempted to show a complete loom, because such showing would encumber the drawings unnecessarily and would tend to cause confusion. In many respects the loom is similar to that illustrated and described in my copending application Serial No. 26,329, filed May 6, 1915 Patent No. 1,214,966, issued February 6, 1917. It may also be stated that the shuttle-carrying mechanism and take-up mechanism are substantially like those shown in the patent to Strowbridge, 446,035.

Figures 1, 2:
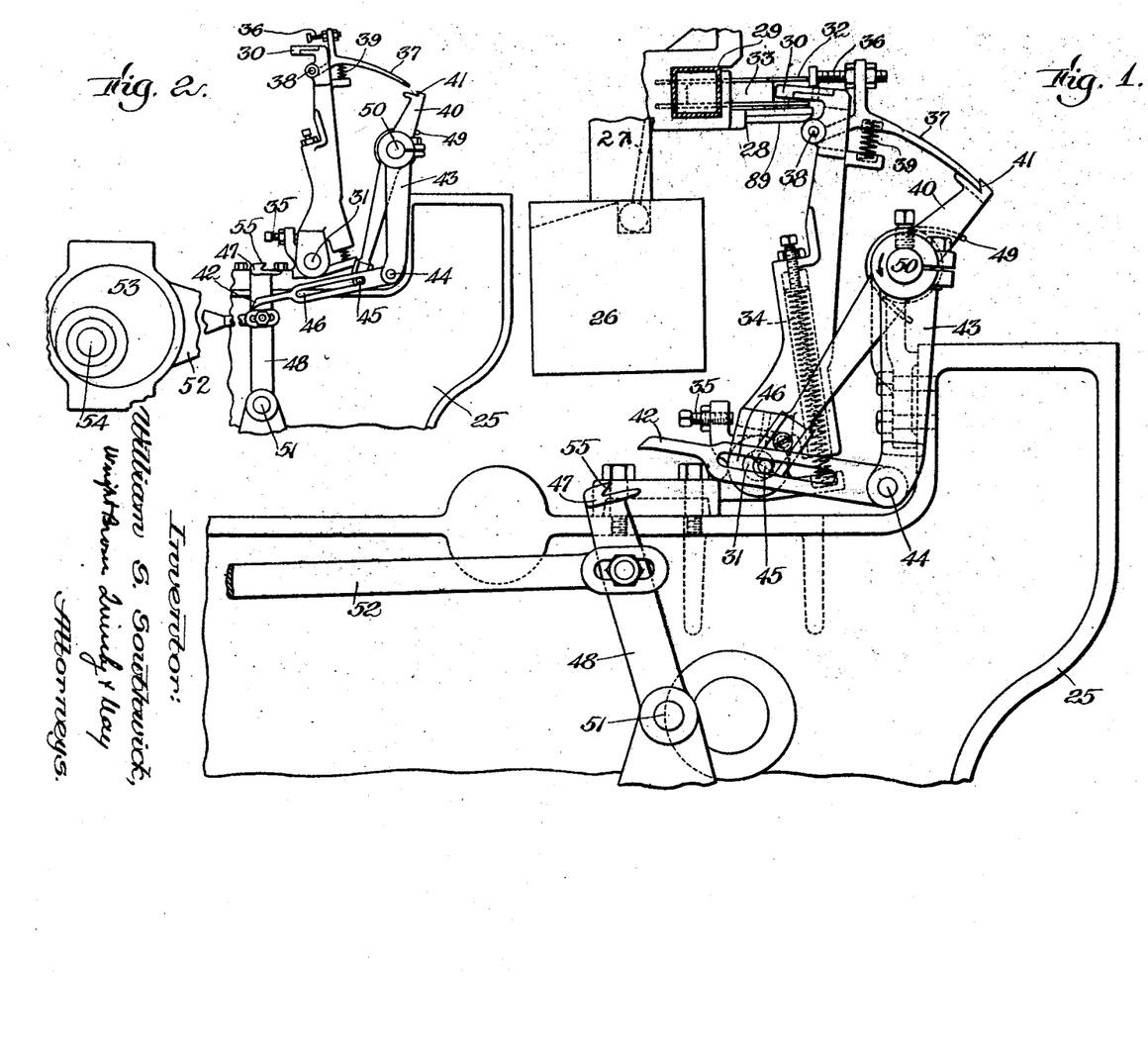
Figure 1 represents an elevation of the filling-controlled mechanism in an intermediate stage of operation. This view includes also the upper front portion of the loom frame, and a portion of the lay. In the present instance the filling-controlled mechanism is mounted at the left-hand end of the loom, near the front; and so far as the loom frame is concerned, this figure is an elevation of the left-hand end, looking from left to right.
Figure 2 represents an elevation of the same filling-controlled mechanism from the same point of view but on a smaller scale and in normal condition, and includes an operating eccentric that does not appear in Figure 1.
Figure 3:
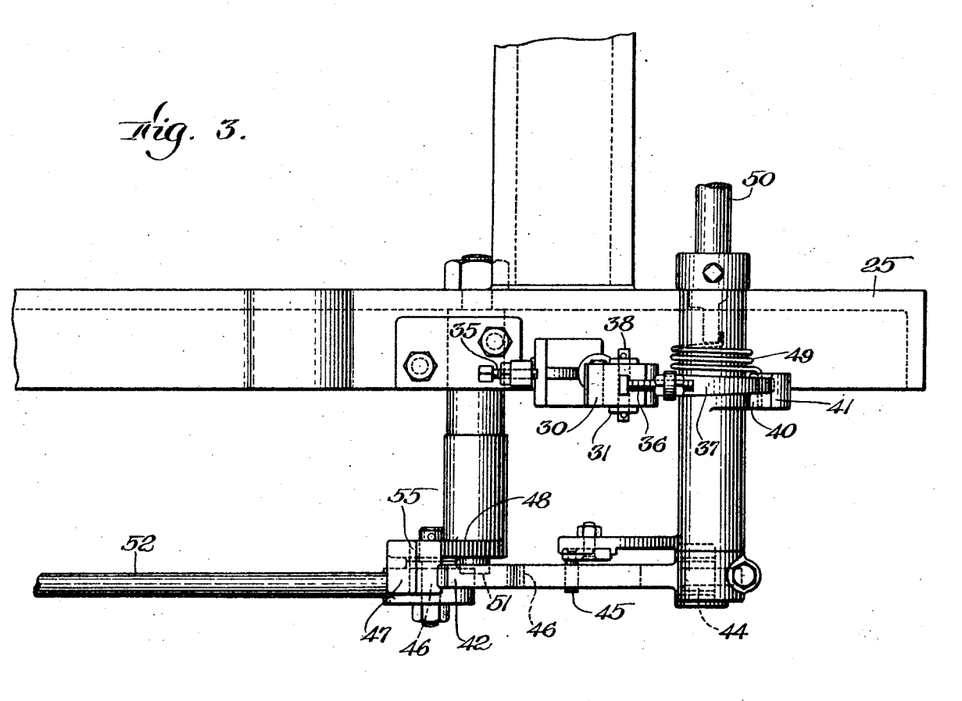
Figure 3 represents a top plan view of the filling-controlled mechanism included in Figure 1.
Figure 21:
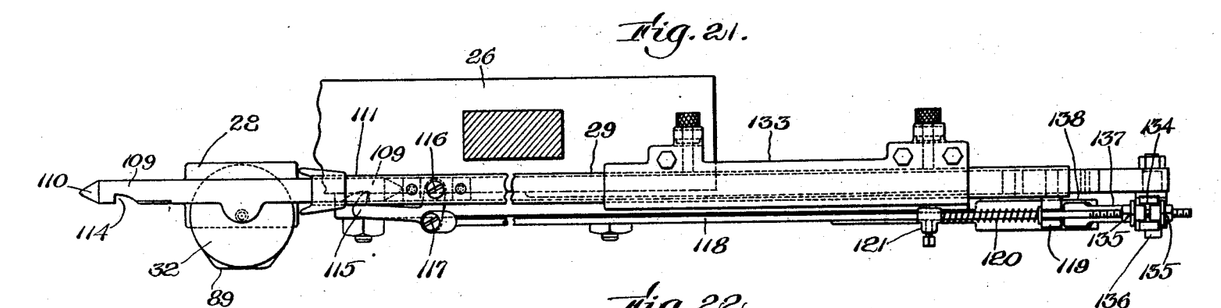
Figure 21 represents a top plan view of one of the two shuttle carriers, with the shuttle supported by the left-hand end thereof. A portion of the shuttle carrier is broken out to enable both ends thereof to be included within the space permitted for the drawing.

Referring to Figure 1,—the frame of the loom is indicated at 25, and the lay 26 is shown at front center. The reed is indicated at 27. The shuttle 28, instead of resting on the lay, as in ordinary looms, is supported by two bars 29 alternately. One of such bars is included in Figure 1, and the other is included in Figures 21 and 22. These bars are arranged substantially in line with each other and are mounted in suitable bearings at the ends of the lay. They are reciprocated toward and from each other to carry the shuttle back and forth through the shed, the inner end of each bar having a socket to receive the shuttle, as shown by Figure 21. The shuttle-carrying bars are provided with latching devices that engage the shuttle, and such latching devices are operated automatically to release the shuttle as the latter is transferred from one bar to the other. The bars move toward each other when the lay is retracted from the fell of the fabric, and at such time the shed is open to receive them. Each bar passes approximately halfway through the shed, the transfer of the shuttle from one bar to the other being effected in the shed so that the shuttle is always sustained by at least one of said bars and is carried through the shed instead of being projected. As shown by Figure 1, the shuttle is at the left-hand end of the loom, that is, the end opposite the replenishing end.

The filling-feeler is indicated at 30. This feeler is an oscillatory arm and is mounted upon a stationary pivot stud 31. Its upper end is formed to enter between the end plates or flanges 32, 32 of the operating spool when the shuttle containing the latter is at the left-hand (in this instance) end of its traverse. The core of the spool is indicated at 33, and although the spool is empty as shown by Figure 1, it is to be assumed that it has a few convolutions of filling on its core. It is for this reason that a narrow space is shown between the core and the feeler, but such space would in practice be taken up by the small amount of filling on the core. According to the conditions represented by Figure 1, the filling has been depleted to such degree as to cause the operation of the filling-replenishing mechanism. The feeler has been moved forward by the filling on the spool, the lay being at front center; but when the lay is retracted from the fell of the fabric, the feeler is moved toward the rear by a helical compression spring 34 as far as the adjustable setscrew 35 will permit. While the loom is running, the feeler is moved forward by the spool once for each two beating-up operations, for it will be understood that the shuttle will be at the replenishing end and at the feeler end alternately when the lay beats up.

So long as there is sufficient filling on the core of the spool, the movements imparted to the feeler will not have any effect on the replenishing mechanism, but when the filling has been so far depleted as to require a change of filling units, the upper end of the feeler will enter between the flanges 32 of the spool so far as to enable the adjustable setscrew 36 to engage the rim of the upper flange as shown by Figure 1. Setscrew 36 is carried by a trip finger 37, and the latter is carried by the feeler, being connected to the latter by a pivot stud 38. A helical compression spring 39 is arranged to bear against the trip finger to keep the latter normally raised, but when the filling on the spool has been so far depleted as to enable the upper flange 32 to strike setscrew 36, the free end of the trip finger 37 is depressed by the action of the spool before the feeler is moved forward by the filling that is on the spool. Consequently, as the feeler is moved forward with the trip finger 37 depressed as shown by Figure 1, said trip finger is caused to strike a rocker 40. This rocker has an undercut shoulder 41 over which the tip of finger 37 would pass, excepting when the latter is depressed as just explained.

The function of rocker 40 is to raise the left-hand end of finger 42. This finger is connected to an arm 43 by pivot stud 44. A pin 45 carried by the lower end of rocker 40 occupies a slot 46 in finger 42. The normal position of finger 42 is shown by Figure 2, in which position the left-hand end of said finger lies below the arc traversed by boss 47 of rocker arm 48; but when rocker 40 is actuated by trip finger 37 is lifts finger 42 above said arc, as shown by Figure 1.

As the lay is retracted toward the rear of the loom the bobbin releases the feeler, and the latter is moved to the rear by its returning spring 34. Trip finger 37 thus releases rocker 40 and the latter is returned part way toward its initial position by a helical torsion spring 49; but while rocker 40 is in the act of returning to its initial position, rocker 48 is moved forward far enough to place boss 47 under the left-hand end of finger 42. Thus the downward movement of finger 42 is arrested by rocker 48; and the latter, continuing to move toward the front of the loom, moves finger 42 in the same direction and transmits such movement to arm 43. Arm 43 is affixed to rockshaft 50, and the latter extends horizontally across the loom to the replenishing end, where other mechanism, hereinafter described, is set in operation to transfer a filling unit from the magazine to the shuttle.

In the present instance rockshaft 50 is utilized to afford a fulcrum for rocker 40, but the latter is loose relatively to the rockshaft, so that it may move independently of the rockshaft and vice versa. Rocker 48 that transmits the motion for turning rockshaft 50 is mounted upon a fulcrum stud 51 and is oscillated continuously while the loom is running, by eccentric rod 52 and eccentric 53. The latter is mounted upon a continuously rotating shaft 54. Boss 47 at the upper end of rocker 48 is provided with an undercut shoulder 55 that abuts against the tip of finger 42 to transmit motion to rockshaft 50 as hereinbefore stated. It may be stated at this time that eccentric 53 is arranged to cause rocker 48 to move toward the front of the loom as the lay is moving toward the rear, but at twice the speed, and vice versa. As rocker 48 moves to the rear after having transmitted the aforesaid motion to rockshaft 50 it releases finger 42 and thus enables the latter to drop so that the return movement of the rocker 40 to its initial position may be completed. While rocker 48 is in the act of transmitting motion to rockshaft 50 the shuttle is being carried through the shed to the replenishing end of the loom, the lay being then at or near its rear position. Then while rocker 48 moves to the rear to release finger 42 as aforesaid, the lay moves forward to beat up the last pick of filling, and this beating up movement causes the transfer of a filling unit from the magazine to the shuttle, the cutting of the last pick of old filling running to the spent spool, and the discharge of the spent filling unit from the shuttle; but before describing the three said operations it will be necessary to describe a mechanism that is adjusted by the aforesaid turning of rockshaft 50 to be actuated by the lay.

Figures 4, 19, 20:
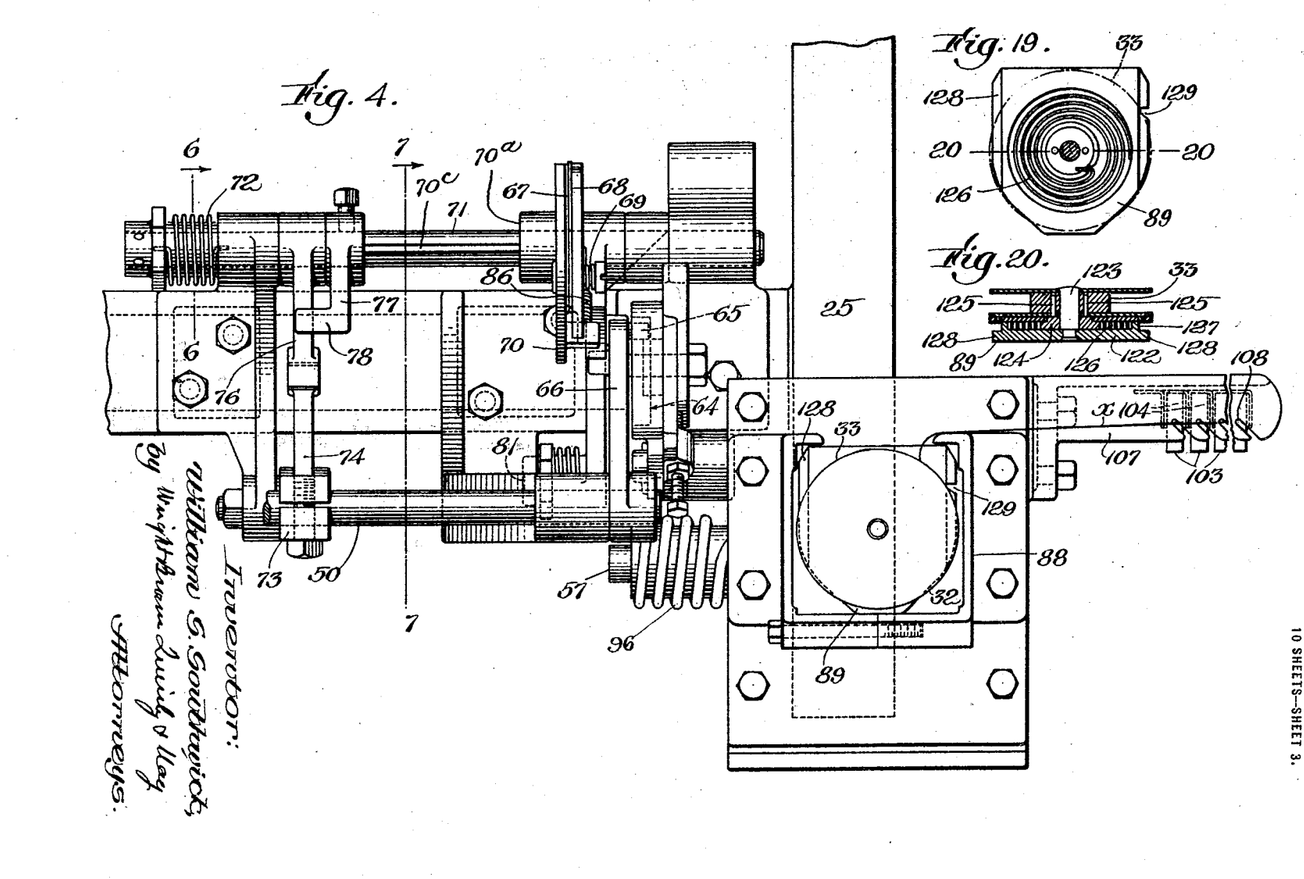
Figure 4 represents a top plan view of the filling-replenishing mechanism at the other end of the loom, and includes the magazine in which the filling units are stored.
Figure 19 represents a top plan view of a spool holder, excepting that the center stud is shown in section. The outline of a spool is represented by a circular broken line.
Figure 20 represents a sectional view through a filling unit in the plane indicated by line 20—20 of Figure 19.
Figure 9:
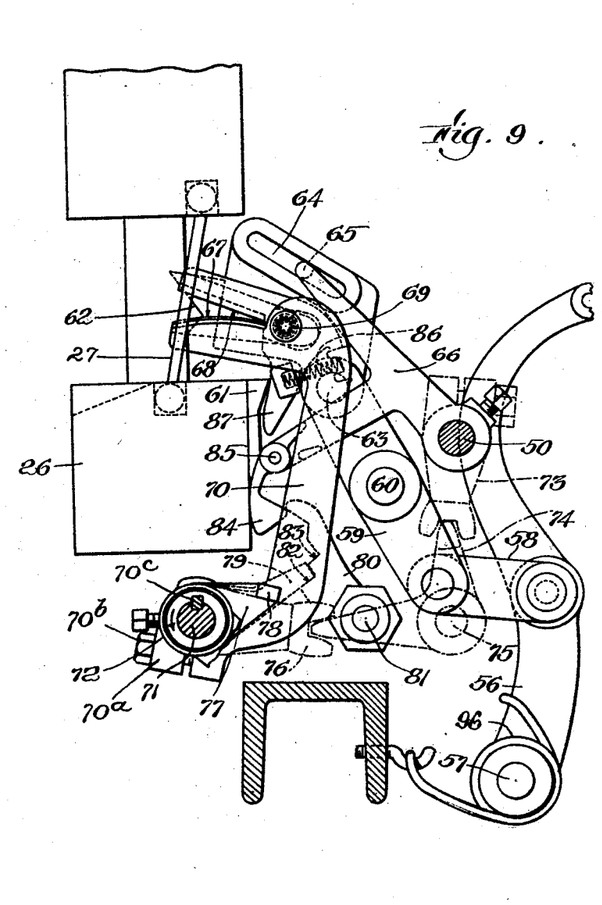
Figure 9 represents a vertical section similar to Figure 6, excepting that the mechanism is in normal or initial position, as when the loom is weaving.
Figure 10:
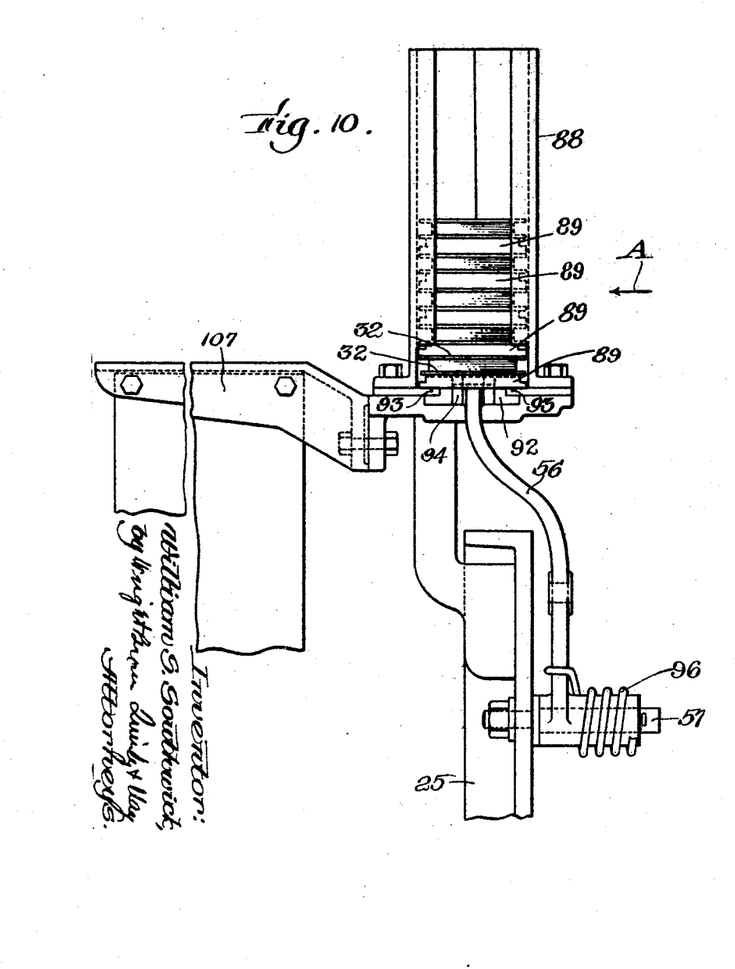
Figure 10 represents a rear elevation of the filling magazine, the direction being from the front toward the rear of the loom.

Figure 9 shows the mechanism that is adjusted by rockshaft 50 said mechanism being at the replenishing end of the lay. This mechanism is also shown by Figure 4 (plan view) and Figure 5 (front elevation). The feeder arm that transfers the filling unit from the magazine to the shuttle is indicated at 56 and its fulcrum stud is indicated at 57. This arm is connected by a link 58 with an operating lever 59. The fulcrum stud of lever 59 is indicated at 60. Lever 59 is arranged to be actuated by a bunter 61 on the lay, and for this purpose it is provided with a member 62 hereinafter termed a "fishtail." The fishtail is mounted upon a pivot stud 63 at the upper end of lever 59. A slot 64 formed in the fishtail is occupied by a finger 65 at the end of an arm 66. Arm 66 is affixed to rock shaft 50. The aforesaid elements are in their normal or initial positions as shown by Figure 9. When rockshaft 50 is turned as aforesaid, it transmits motion through arm 66 to the fishtail, and the latter is thereby lowered into the path of bunter 61 as shown by broken lines in Figure 7. Consequently, as the lay beats up the last pick of old filling it moves the fishtail forward to the position shown by solid lines in Figure 7, thereby moving feeding arm 56 from the broken-line position to the solid-line position. The remainder of the feeding mechanism will be described in due course.

Figure 6:
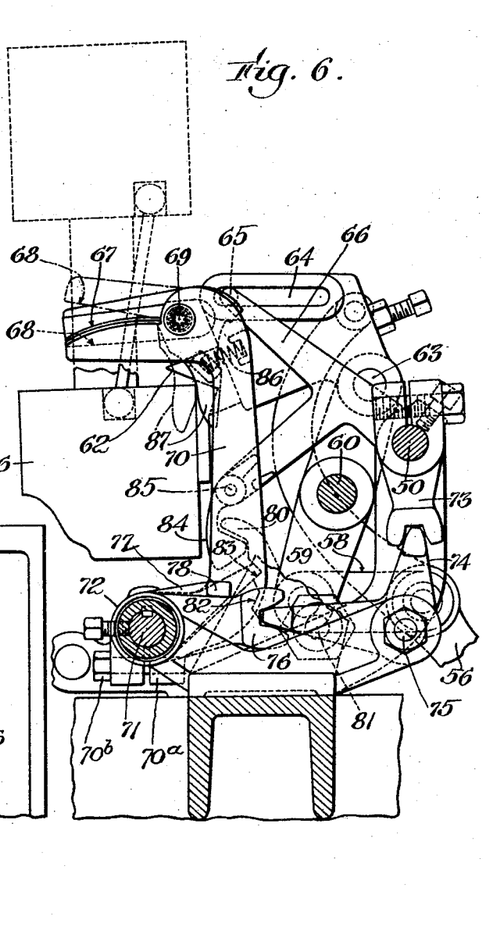
Figure 6 represents a vertical section in a plane from front to rear through the structure intersected by line 6—6 of Figure 5, the mechanism being in the act of replenishing the filling, and the filling cutter being in cutting position.
Figure 7:
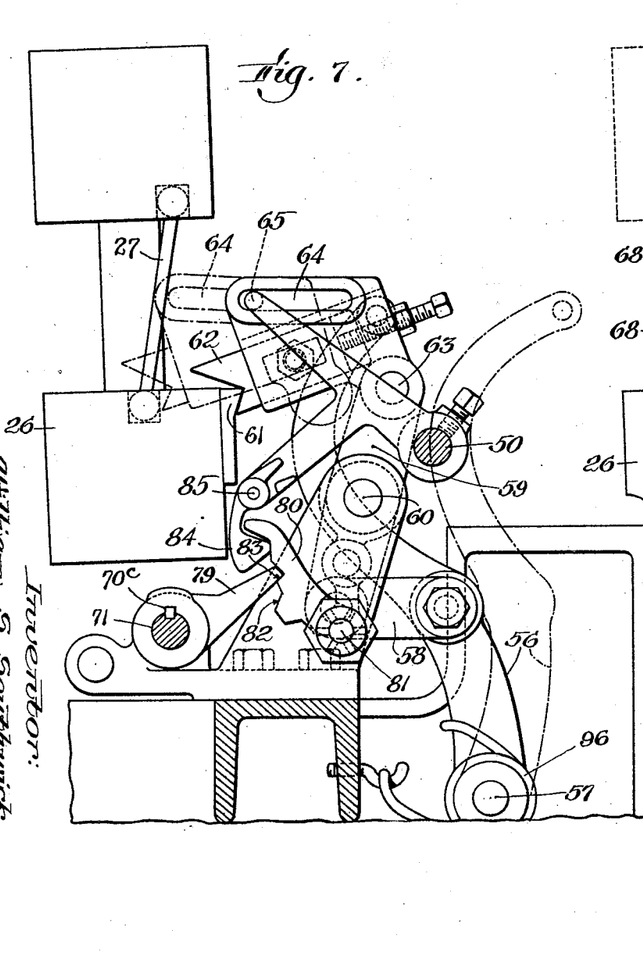
Figure 7 represents a sectional view in a vertical plane from front to rear through the structure intersected by line 7—7 of Figure 5, but omitting the cutter. This figure is similar to Figure 6 as to the positions of the parts shown.

The aforesaid turning of rockshaft 50 is also utilized to move the filling cutter to operative position. The filling cutter comprises two cooperative shearing members the shearing edges of which are indicated at 67 and 68. The two shearing members are connected by a pivot stud 69. The lower shearing member includes an arm 70, of which a portion indicated at 70ª is arranged upon a rockshaft 71, and adapted to clamp the latter when screw 70ᵇ is set up tightly. The cutter is thus capable of being set at various positions along the length of the rockshaft, to cut close to the selvage of fabric of different widths. A spline 70ᶜ locks the arm 70 against slipping rotatively in relation to the rockshaft. A helical torsion spring 72 holds the cutter normally away from operative position, as shown by Figure 9, but when rockshaft 50 is turned to lower the fishtail it transmits motion to the rockshaft 71 to move the cutter to operative position as shown by Figure 6. Figures 6 and 7 represent the same condition, but some of the elements included in Figure 6 are omitted from Fig. 7. The elements that move the cutter to cutting position are a forked arm 73 affixed to rockshaft 50, a bell-crank lever 74 mounted upon fulcrum stud 75, a forked arm 76 loosely mounted upon rockshaft 71, and an arm 77 affixed to rockshaft 71 and provided with a finger 78 at its outer end arranged to overlie arm 76. See Figure 4. The aforesaid turning of rockshaft 50 causes arm 76 to rise, and arm 76 thus engages and moves finger 78 to turn rockshaft 71. The cutter, on reaching cutting position, is caught by a latch so that it will remain in such position until the first pick of new filling has been beaten up. For this purpose rockshaft 71 is provided with a finger 79 and the tip of this finger coacts with a pivoted latch 80. The pivot member of said latch is indicated at 81. The latch has two shoulders, 82 and 83, and when the mechanism is in normal position as shown by Figure 9, finger 79 rests on the lower shoulder 82, but when the cutter is moved to cutting position the tip of finger 79 is raised above shoulder 83, thus permitting the latch to drop to the position shown by Figures 7 and 8. Shoulder 83 thus serves to lock rockshaft 71 to keep the cutter in cutting position. The latch is subsequently retracted to release finger 79 by the beat-up motion of the lay through the medium of a member 84. This member is carried by a branch of arm 66 and is connected thereto by a pivot stud 85. The operation and timing of the releasing device will be hereinafter described in due course.

The shearing members are normally held open as shown by dotted lines in Figure 6 and full lines in Figure 9, so that the filling members that are to be cut may enter between them. For this purpose a helical compression spring 86 is arranged so that one end is seated against a portion of arm 70 while the other end is seated against a finger formed on the upper shearing member. Finger 87 is arranged to be engaged and actuated by the lay when the cutter is in cutting position, the open and closed positions of the cutter being shown in Figure 6. Inasmuch as a relatively short motion of the lay is sufficient to operate the cutter, the latter is arranged so that it does not begin to close until after the feeder arm 56 has traversed the greater part of its transferring stroke.

Figure 11:
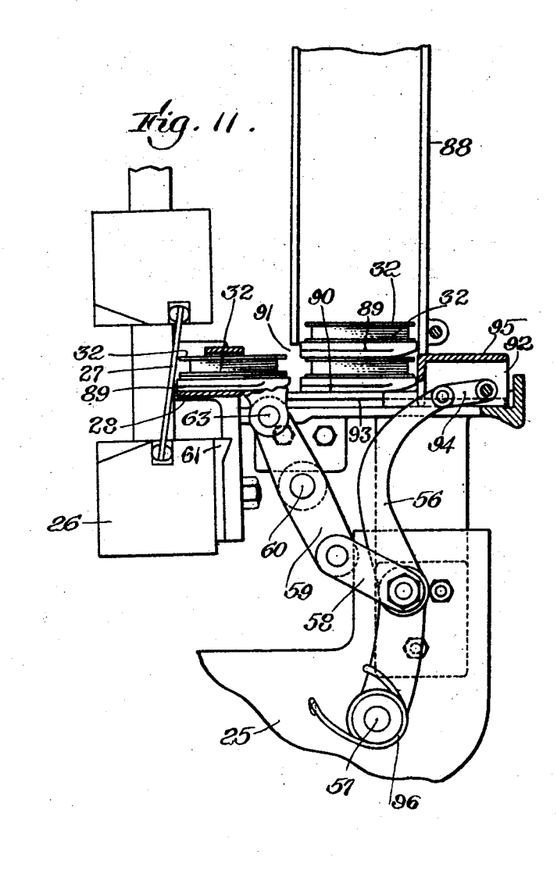
Figure 11 represents an elevation, partly in section, of the structure included in Figure 10, looking in the direction of arrow A, a part of the magazine being omitted. In this figure the mechanism that transfers the filling from the magazine to the shuttle is shown in normal or initial position.
Figure 12:
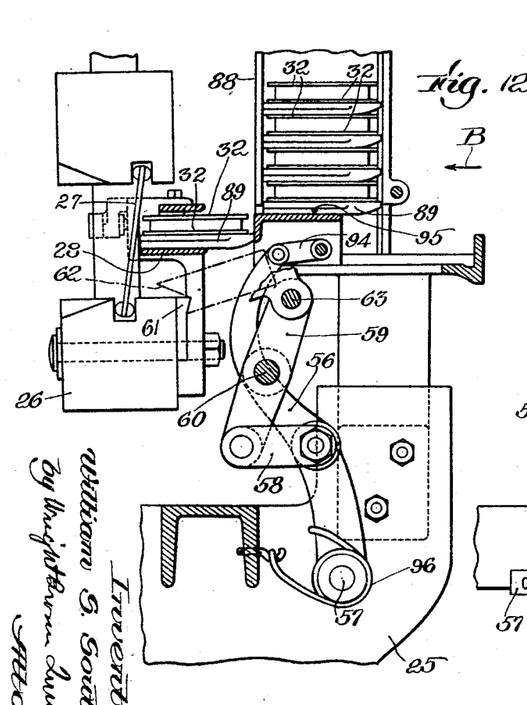
Figure 12 represents a view similar to Figure 11, excepting that the transferring mechanism is in the act of transferring a filling unit to the shuttle.

The filling magazine comprises a chute 88 in which the filling units are arranged one upon another in the form of a stack. Each filling unit comprises a spool and a holder therefor, the holders being indicated at 89. The lowest filling unit in the magazine rests upon a stationary support 90 that registers with the corresponding support in the shuttle. The rear wall of the magazine is cut away to provide an opening 91 through which the bottom filling unit is pushed by a sliding pusher 92. This pusher is arranged to slide on stationary guides 93. The upper end of feeder arm 56 is connected to the pusher by a pivoted link 94. The normal position of the pusher is shown by Figure 11. When the feeder arm 56 is actuated by the lay as hereinbefore explained, it moves the pusher toward the shuttle and the lowest filling unit is thereby pushed into the shuttle as shown by Figure 12, the remaining units in the magazine being supported then by the top surface 95 of the pusher. As the new filling unit goes into the shuttle from the front the spent unit goes out from the shuttle at the rear and may drop into a chute or other receptacle, not shown, but while the spent unit is being discharged from the shuttle the upper member of the cutter is depressed, thereby cutting the end of filling that runs to the spent unit. The lay immediately moves to the rear, thereby releasing the fishtail. A spring 96 thereupon acts to return the feeder arm 56 and filling pusher to normal position. At the same time the fishtail is raised to its normal position, and for this purpose a helical torsion spring 97 (Figure 5) is coiled about rockshaft 50. One end of said spring is anchored to a fixture 98 in which the rockshaft has a bearing, and the other end is connected to a collar 99 affixed to the rockshaft.

Figure 8:
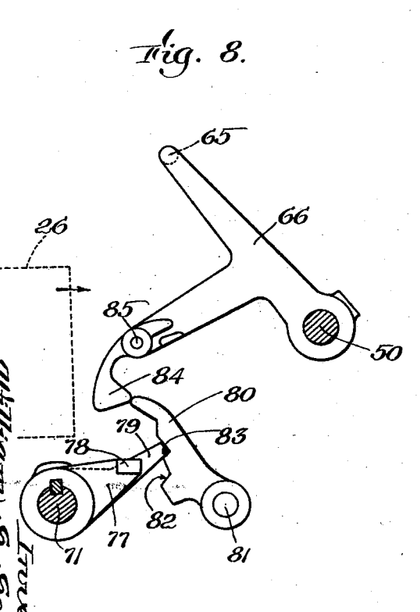
Figure 8 represents an elevation, partly in section, of the elements that control the return of the cutter to its initial position after the second cutting operation, said elements being adjusted to cause such return as soon as the second cutting operation has been performed.

While the lay is making its first stroke to the rear after having transferred a new filling unit into the shuttle the latter is carried through the shed, the cutter meanwhile remaining open and in cutting position. The ends of filling of all the filling units in the magazine are connected to tension devices hereinafter described that hold them while the shuttle makes its first trip through the shed after having received a new filling unit, and the outlying end of new filling is thus held in such position that it will enter between the shearing members of the cutter on the next beat-up of the lay. The second cutting operation is effected by the lay in the same manner as the first cutting operation; but simultaneously with the second cutting operation the lay strikes the pivoted member 84, which is then in the position shown by Figure 8 as a result of restoring rockshaft 50 to its normal position. Member 84 is thus supported in register with the tip of latch 80, and as the lay completes its beat-up stroke it actuates member 84 and thereby transmits motion to the latch to retract the latter from finger 79. Rockshaft 71 is thus released so that its returning spring 72 may restore it to its normal position, thereby retracting the cutter from operative position. The cutter, however, has cutting motion imparted to it by the lay before it is retracted from operative position, and the end of the new filling is thus severed before the second pick of new filling is laid.

Figure 13:
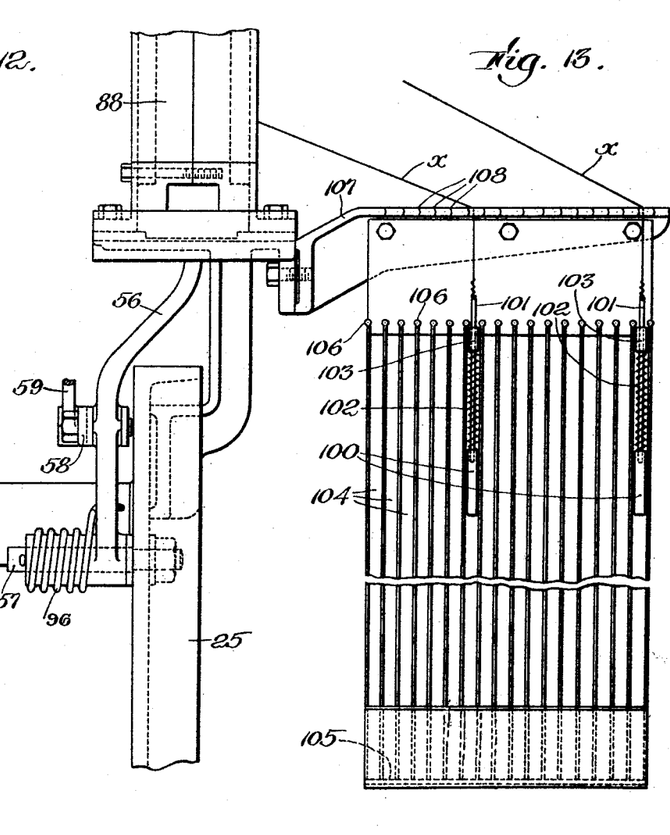
Figure 13 represents a front elevation of the structure included in Figure 12, as indicated by arrow B, with the addition of the means for removing the several units of new filling.

Referring to Figure 13,—two of the tension devices that hold the outlying ends of new filling are shown, but it will be understood that a relatively large number may be used. In the present instance provision is made for 17 such devices, and it would therefore be possible to have 17 filling units in the magazine at one time. Each tension device comprises a weight 100, a rod 101, a helical spring 102, and a sliding member 103. The lower end of the rod is affixed to the weight 100, and the upper end is formed with an eye through which the end of filling $x$ may be passed. The end of the filling can be fastened to the rod by passing it through the eye and twisting it around the adjacent portion that has not passed through the eye, as shown. The tension devices are arranged in separate vertical chutes 104, said chutes being arranged side by side in a gang and being provided with a bottom plate 105. The upper ends of the partitions that define the chutes have enlargements 106 that restrict the upper ends of the chutes so that the sliding members 103 cannot be withdrawn upwardly from the latter. The helical springs 102 are coiled about the rods 101 and are arranged between the weights 100 and the sliding members 103. A notched guide member 107 is arranged above the chutes and is provided with a plurality of filling-receiving notches 108 that register respectively with the chutes. In the course of charging the magazine the ends of filling $x$ are drawn out through the up slot in the rear wall of the magazine as shown by Figure 4, and are drawn laterally into the notches 108 and then fastened to the respective tension devices. When fastening the end of a filling to a tension device the latter will be raised to or near the upper end of its chute, and consequently as the filling units descend in the magazine the tension devices will descend accordingly and maintain sufficient tension on the filling members to keep them substantially straight and prevent entangling.

The tension devices serve the additional function of removing the ends of filling as the latter are cut in the course of beating up the first pick of new filling after a change of filling units. Each filling unit includes a tension device that is arranged to resist rewinding rotation of the bobbin, and as the shuttle makes its first trip through the shed after having received a fresh filling unit, the unwinding of the bobbin therein does not begin until the shuttle has traveled far enough to raise the weighted tension device to the top of its chute. In this way the filling is drawn lengthwise through its notch 108 and the waste of filling is reduced. When the upward movement of the sliding member 103 is arrested by the enlargements 106, further upward movement of the weight 100 compresses spring 102, and when the combined forces of gravity and spring stress exceed the force of the tension device that is carried by the filling unit the drawing action of the filling member ceases and the spool begins to unwind. Thus the weighted tension device is also a cushioning device, for its force that sets up unwinding rotation of the spool accumulates gradually as spring 102 is compressed, and the likelihood of breaking the filling is averted.

The weighted tension device remains at the upper end of its chute until the filling member, which in the meantime is drawn laterally between the shearing edges of the cutter, has been cut. Such cutting occurs simultaneously with the beating up of the first pick of new filling, and the severed end of filling is immediately pulled back by the weighted tension device that drops to the bottom of its chute.

The structural details of the shuttle and filling unit are shown by Figures 14 to 22. The shuttle that is indicated as a whole at 28 in Figure 1 comprises two stem portions 109 the end portions 110 of which are tapered to afford easy entrance into the sockets 111 with which the shuttle-carrying bars 29 are provided. A chamber 112 formed in the shuttle is adapted to contain a filling unit and is open at the front of the shuttle to receive the filling unit and is open at the rear to discharge the same. The shuttle is provided with suitable guides 113 adapted to coact with complemental guides formed on the spool holder that is also carried by the carrier 29. A helical compression spring 120, coiled about the rod and compressed between guide member 119 and a collar 121 that is affixed to the rod, holds latching device 115 normally in latching position, as shown by Figure 21.

Figures 5, 14, 15, 16, 17, 18:
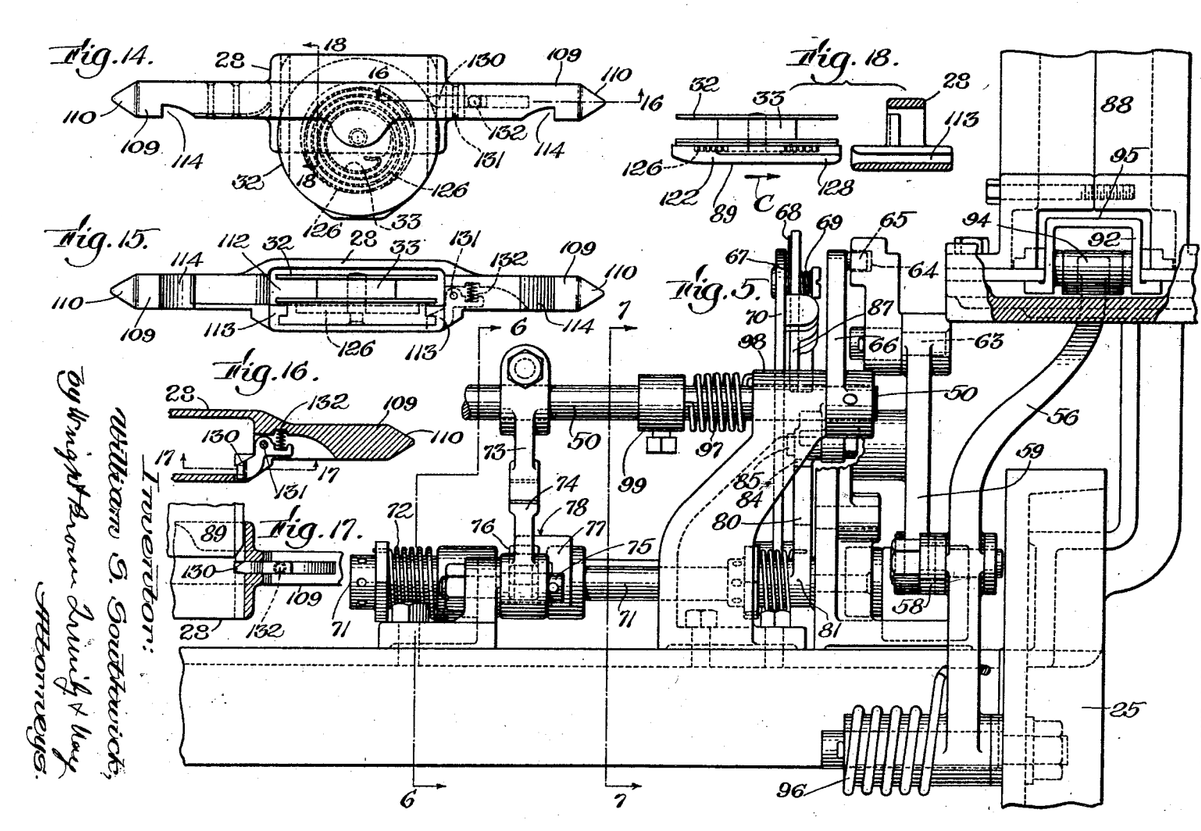
Figure 5 represents a front elevation of the structure included in Figure 4, the upper portion of the magazine being broken away.
Figure 14 represents a top plan view of the shuttle, with a filling unit in operative position therein.
Figure 15 represents a front elevation of such shuttle and filling unit.
Figure 16 represents a sectional view in a vertical plane through the right-hand end of the shuttle, as indicated by line 16—16 of Figure 14.
Figure 17 represents a horizontal section, looking up, through the structure intersected by line 17—17 of Figure 16, and includes a portion of a filling unit in the act of entering the shuttle.
Figure 18 represents a vertical section through the shuttle, as indicated by line 18—18 of Figure 14, and includes a filling unit about to enter the shuttle, the direction of movement of the filling unit being indicated by arrow C.

The structure of the filling units is shown by Figures 18, 19 and 20. The holder for the spool comprises a base 122, a center spindle or stem 123, and a rotatable collar 124 loosely mounted on the stem. This collar is provided with pins 125, and the core 33 of the spool is provided with holes or sockets adapted to receive said pins. A coiled spring 126 similar to a clock spring is anchored at its inner end to the collar 124 and is compressed radially and confined by an annular flange 127 formed on the base. This spring acts as a tension device to oppose unwinding rotation of the bobbin relatively to its holder, the tension being the result of friction between the outer portion of the spring and the flange 127. In practice I have found it advantageous to use such spring when employing a hard wire for the filling whether large or small; in some cases, I have found it practical to employ a plain friction stationary tension as distinguished from said spring when employing large soft wire. The base 122 is provided with parallel ribs or flanges 128 adapted to slide in the guides 113 of the shuttle. The leading ends of the flanges 128 are beveled as shown by Figures 18 and 19, and the receiving ends of the guides 113 are correspondingly beveled, as shown by Figure 18, to facilitate the insertion of the holder into the shuttle. One of the flanges 128 (see Figure 19) is provided with a notch 129 to receive a latching device 130 as shown by Figure 14. This latching device is carried by the shuttle and is mounted upon a pivot pin 131. A helical compression spring 132 holds the latching device normally in latching position. One side of the latching device is beveled as shown by Figures 14 and 16, in consequence of which the latch is displaced by the leading end of the notched flange of the spool holder as the latter slides in the shuttle, and the traverse of the pusher 95 is sufficient to move the filling unit to a position where notch 129 registers with the latching device. The latter thereupon snaps into the notch and holds the filling unit in the desired position relatively to the shuttle; but when the next filling unit is moved into the shuttle, it displaces the spent filling unit, and the latter in turn displaces the latching devices and is discharged from the rear side of the shuttle.

Although, as hereinbefore stated, the bars 29 that carry the shuttle back and forth through the shed are reciprocated toward and from each other substantially as in the patent to Strowbridge, 446,035, a brief description of the shuttle-carrying operation is given herewith. The carrying bars 29 are mounted in guides 133 that are carried by the lay, and are adapted to move endwise but are not capable of turning about their axis. Rotative movement is prevented in the present instance by the square cross-sectional shape of the bars 29 and the corresponding shape of the guides 133. The bars 29 are retracted out of the shed while the lay beats up, and are moved toward each other as the lay moves to the rear, each bar moving substantially half way through the shed. The shuttle is thus transferred from one bar to the other, while passing through the shed. The leading end of the shuttle goes into the receiving carrier before the trailing end of the shuttle leaves the delivering carrier, and the two carriers travel together in unison for a short distance before the delivering carrier is retracted. At the instant when the leading end of the shuttle enters the receiving carrier the latching device 115 of the latter is retracted, but the latching device of the delivering carrier is in latching position. Then while the two carriers travel in unison, each supporting one end of the shuttle, the latching device 115 of the delivering carrier is retracted to release the shuttle, and the latching device of the receiving carrier is moved to latching position, the delivering carrier thus relinquishing control of the shuttle and the receiving carrier assuming such control. The delivering carrier thereupon ceases to move in unison with the receiving carrier and is retracted, the receiving carrier continuing the transfer of the shuttle through the shed. When the shuttle is moved in the opposite direction the same order of operations takes place.

Figure 22:
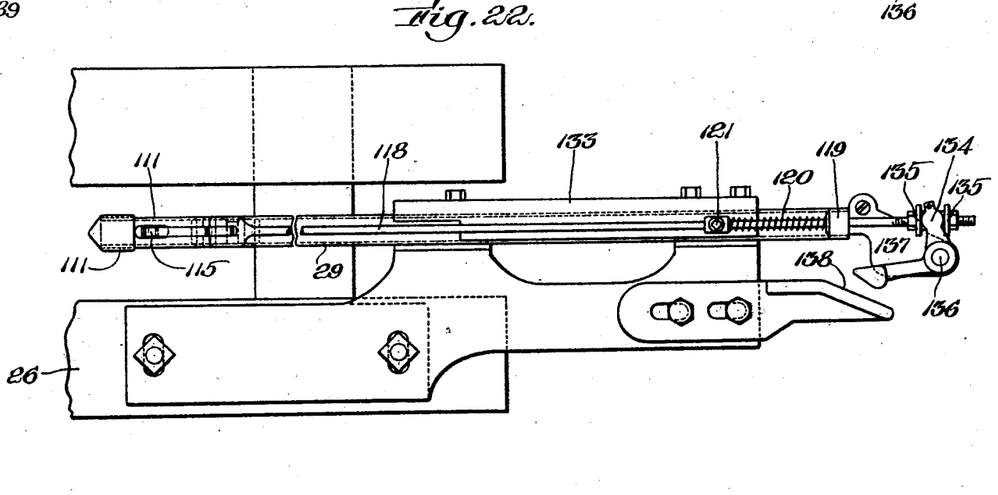
Figure 22 represents a front elevation of the structure included in Figure 21, excepting that the shuttle is omitted.
Figure 25:
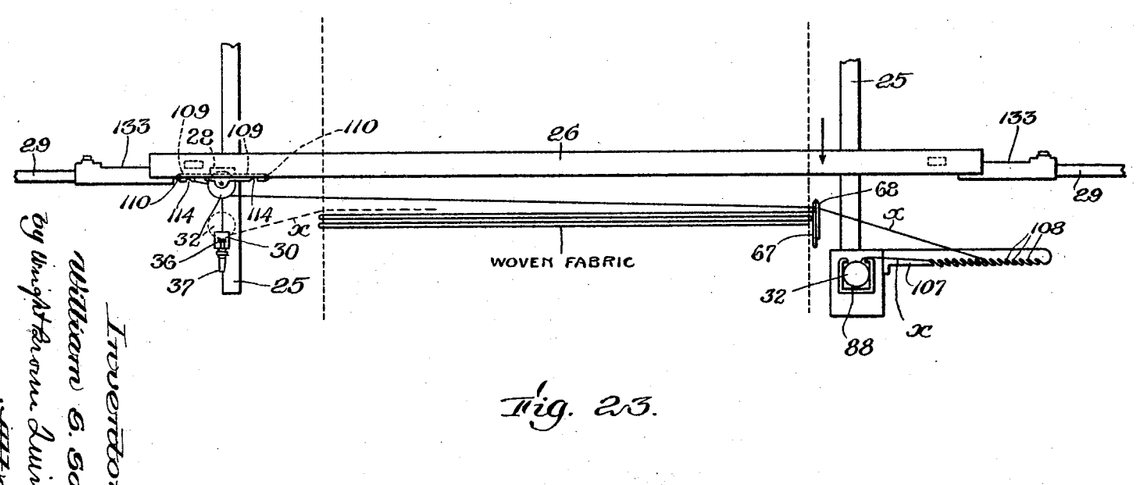

Mechanism for operating the latching devices 115 is shown by Figures 21 and 22, similar mechanism being provided at the opposite end of the lay for operating the companion latching device. A bell-crank lever 134 is connected to the latch-operating rod 118 by flanged screw collars 135, the latter being screwed upon the rod 118 and secured in the desired position of adjustment by locknuts. The bell-crank lever is mounted upon a pivot stud 136, which is carried by bracket 137 affixed to the outer end of the shuttle carrying bar 29. A cam 138 is affixed to the lay in position to be engaged by the bell-crank lever in such manner that the latter will be actuated to retract the latching device 115 as the bar 29 moves inwardly. The bell-crank 134 of the receiving carrier rides upon its cam 138 before the bell-crank lever of the delivering carrier rides upon corresponding cam, but during the short period when the two carriers move in unison as aforesaid, the bell-crank of the delivering carrier rides upon its cam 138 and the bellcrank of the receiving carrier leads its cam, with the results hereinbefore stated.

I claim:

1. The combination with a loom, a shuttle, a filling magazine and a plurality of filling units therein, and means arranged to transfer said filling units, one by one, from said magazine to said shuttle, of a plurality of weights and guides therefor, said weights being movable up and down independently of each other when the filling ends are attached respectively to them, said weights being arranged to take up slack from said filling ends and to yield up such slack in consequence of the first traverse of each filling unit through the shed.

2. In a loom, a shuttle, a filling magazine, a filling unit therein, and means arranged to transfer said unit from said magazine to said shuttle, a tension device connected to the free end of the filling and arranged to maintain the filling under tension in the magazine, the tension for the free end of the filling comprising a sliding weight, a stop to limit the motion of the weight, and a spring interposed between the stop and weight, to act as a shock-absorber.

3. In a loom, a shuttle, a filling magazine, a filling unit therein, and means arranged to transfer said unit from said magazine to said shuttle, a tension device connected to the free end of the filling and arranged to maintain the filling under tension in the magazine, the tension for the free end of the filling comprising means for applying tension to the filling, and a shock-absorber arranged to modify the action of said means;

4. In a loom organized to weave wire fabric, a positively-driven shuttle, a filling magazine, a spool in said magazine carrying wire filling, means acting on said spool to resist the unwinding of said filling, tension means acting on the free end of said filling to co-act with the first said means to maintain the free end of said filling under tension while the spool is in transit from the magazine to the shuttle, and means for transferring said spool from the magazine to the shuttle.

5. In a loom organized to weave wire fabric, a positively-driven shuttle, a filling magazine, a wire filling unit in said magazine, means acting on said unit to yieldingly resist the unwinding of said filling, means acting on the free end of said filling co-acting with the first means to maintain said filling under tension while in transit from the magazine to the shuttle, the means to transfer said unit from the magazine to the shuttle.

6. In a loom organized to weave wire fabric, a positively-driven shuttle, a filling magazine, a wire filling unit in said magazine, means to transfer said unit from the magazine to the shuttle, means on said unit to yieldingly resist the unwinding of the filling, means acting on the free end of said filling co-acting with the first means to maintain the filling under tension while in the magazine and until the filling is caught by the warp, and a filling cutter arranged to cut the unwoven free end of said filling while so positioned.

7. In a loom organized to weave wire fabric, a positively-driven shuttle, a wire filling unit therein, means acting on said unit to yieldingly resist the unwinding of the filling, a magazine, a wire filling unit therein, means for transferring said unit from the magazine to the shuttle, means acting on said unit to yieldingly resist the unwinding of the filling, a tension device connected to the free end of said filling co-acting with said means to maintain the free end of the filling under tension until caught by the warp, a filling cutter, means timed to operate said cutter first to cut the rear end of the filling in the exhausted filling unit and thereafter to cut the free end of the filling in the new filling unit while the said fillings are so positively positioned.

8. In a loom organized to weave wire fabric, a positively-driven shuttle, a wire filling unit in said shuttle, a feeler arranged to maintain engagement with said unit and to operate when said unit has been depleted to a predetermined point, a filling magazine, a wire filling unit in said magazine, means acting upon said unit to yieldingly resist the unwinding of the filling, tension means connected to the free end of said filling to co-act with said first means to maintain the free end of the filling under tension until caught by the warp, and means controlled by the operation of the feeler to transfer a unit from the magazine to the shuttle.

9. In a loom organized to weave wire cloth, a lay, a positively-driven shuttle, a wire filling unit therein, means acting on said unit to yieldingly resist the unwinding of the filling, a filling magazine, a filling unit in said magazine carrying wire filling, means to transfer said unit from the magazine to the shuttle, means acting on said unit to yieldingly resist the unwinding of said filling, means acting on the free end of said filling to co-act with said unit means to maintain the free end of the filling under tension while in the magazine and until caught by the warp, a filling cutter, means timed to operate said cutter first to operate to sever the unwoven end of the filling in the exhausted filling unit and thereafter to cut the free end of the filling of the new filling unit while in said predetermined position, a filling feeler arranged to engage the filling in the shuttle and to be operated when the filling is exhausted to a predetermined point, connections between said feeler and said transfer means to operate the latter, connections between said feeler and cutter to cause the operation of the latter, and means whereby the lay operates the cutter after the latter has been timed to act by the feeler.

10. In a loom for weaving wire fabric, a positively-driven shuttle, a filling magazine, a wire filling unit therein, a friction device co-acting with said unit to yieldingly resist the unwinding of the filling, a tension device connected to the free end of the filling to co-act with the friction device to maintain the filling under tension in the magazine, and means arranged to transfer said unit from the magazine to the shuttle.

11. In a loom organized to weave wire fabric, a positively-driven shuttle, a filling magazine, a wire filling unit therein, means on said unit to yieldingly resist the unwinding of the filling, means connected to the free end of the filling to co-act with said first mentioned means to maintain the filling under tension in the magazine and until caught by the warp, and means for transferring said unit from the magazine to the shuttle.

In testimony whereof I have affixed my signature.

WILLIAM S. SOUTHWICK.